United States Patent
Horng et al.

(10) Patent No.: US 6,982,037 B2
(45) Date of Patent: Jan. 3, 2006

(54) METHOD FOR TREATING WASTEWATER/WATER WITH MEMBRANE BIOREACTOR

(75) Inventors: Ren-Yang Horng, Hsinchu (TW); Wang-Kuan Chang, Hsinchu (TW); Hsin Shao, Hsinchu (TW); Min-Chao Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 10/424,060

(22) Filed: Apr. 28, 2003

(65) Prior Publication Data

US 2004/0079701 A1    Apr. 29, 2004

(30) Foreign Application Priority Data

Oct. 25, 2002    (TW) ............................... 91125326 A

(51) Int. Cl.
*C02F 3/10*    (2006.01)
(52) U.S. Cl. ...................... 210/615; 210/151; 210/616; 210/620; 210/636; 210/650
(58) Field of Classification Search ................ 210/150, 210/151, 321.69, 605, 615–617, 636, 639, 210/650, 651, 620
See application file for complete search history.

(56) References Cited

U.S. PATENT DOCUMENTS

| | | | | | |
|---|---|---|---|---|---|
| 4,566,971 | A | * | 1/1986 | Reimann et al. | 210/616 |
| 5,639,373 | A | * | 6/1997 | Mahendran et al. | 210/636 |
| 6,007,712 | A | * | 12/1999 | Tanaka et al. | 210/151 |
| 6,027,649 | A | * | 2/2000 | Benedek et al. | 210/639 |

FOREIGN PATENT DOCUMENTS

| JP | 09925487 | * | 9/1997 |
|---|---|---|---|
| JP | 409225487 | * | 9/1997 |

* cited by examiner

*Primary Examiner*—Joseph Drodge
(74) *Attorney, Agent, or Firm*—Bacon & Thomas, PLLC

(57) ABSTRACT

Method of waste water/water treatment in a submerged membrane bioreactor is disclosed. The bioreactor includes a tank containing a mixed liquor having microorganism; porous carriers in the mixed liquors; and a filtration module immersed in the mixed liquor and having a permeate side into which fluid can flow only through the filtration module. The method includes introducing an influent into the tank; applying a negative pressure source to the permeate side so that liquid in the tank penetrates the filtration module into the permeate side and flows out from the tank; and aerating the mixed liquor in the tank so that the porous carriers keep contact with the filtration module, and thus reduce fouling of the filtration module.

6 Claims, 3 Drawing Sheets

METHOD FOR TREATING WASTEWATER/WATER WITH MEMBRANE BIOREACTOR

FIELD OF THE INVENTION

The present invention relates generally to a water treatment method, and more particularly to a wastewater treatment method with a submerged membrane bioreactor filled with multiple porous carriers.

BACKGROUND OF THE INVENTION

One of the features of the membrane bioreactor is its capability to maintain high sludge concentration in reactor. The bioreactor is relatively efficient in the enhancement of the microbial diversity for degradation of specific contaminants due to its extended SRT. In addition, the membrane bioreactor need fewer footprints and has lower sludge yield. According to previous study, the fouling potential on the surface of membrane is directly proportional to the sludge concentration in the bulk solution. The reduction of fouling on the surface of the membrane in the reactor is usually conducted by backwash of air, water, or chemical agents to maintain a desired flux of the membrane bioreactor. However, the process of the back wash causes a temporary interruption of the normal operation of the membrane bioreactor. Such operational interruption undermines the cost-effectiveness of the membrane bioreactor and causes an added complication to the wastewater/water treatment system.

SUMMARY OF THE INVENTION

The primary objective of the present invention is to provide a wastewater/water treatment method in which a membrane bioreactor is filled with porous carriers to reduce the fouling potential on the surface of membrane. The wastewater/water treatment method of the present invention is capable of reducing the amounts of microorganisms suspended in the reactor without upsetting the population of microorganism grown on the porous carriers which are filled in the membrane reactor. The wastewater/water treatment method of the present invention eliminates the process of back wash, or reduces the frequency of back wash process. In addition, the wastewater/water treatment method of the present invention is improved to an extent that the fouling of filtration module is reduced and a preset operational flux and a lower transmembrane pressure are maintained.

The features, functions, and advantages of the present invention will be more readily understood upon a thoughtful deliberation of the following detailed description of the present invention with reference to the accompanying drawings.

DETAILED DESCRIPTION OF THE INVENTION

The service life of a membrane module can be effectively prolonged by reducing the fouling of the membrane module that is formed in a membrane bioreactor. In addition, a reduction in the fouling of the membrane module can prevent decline of the flux and reduce the energy consumption as well as the frequency of back wash.

The membrane bioreactor of the present invention is provided with multiple porous carriers for the purpose of reducing the fouling potential of the membrane. The porous carriers serve as a shelter on which microorganisms are grown fixedly in the reactor, thereby reducing the amount of the suspended microorganisms in the reactor. The membrane bioreactor is susceptible to the fouling if the amount of the suspended microorganism in the reactor exceeds a certain threshold. However, it must be noted here that the total amount of the microorganism in the membrane bioreactor is not affected by the presence of the porous carriers. In addition, the porous carriers come in contact with the outer surface of the membrane module under the influence of the airlift action of an aerating device in operation. The microorganisms attached to the outer surface of the membrane module can be easily removed therefrom by the slight mechanical friction between the porous carriers and the membrane module. As a result, the microbial fouling is effectively reduced. In the meantime, the flux is kept constant and backwash is eliminated.

Figure 1:
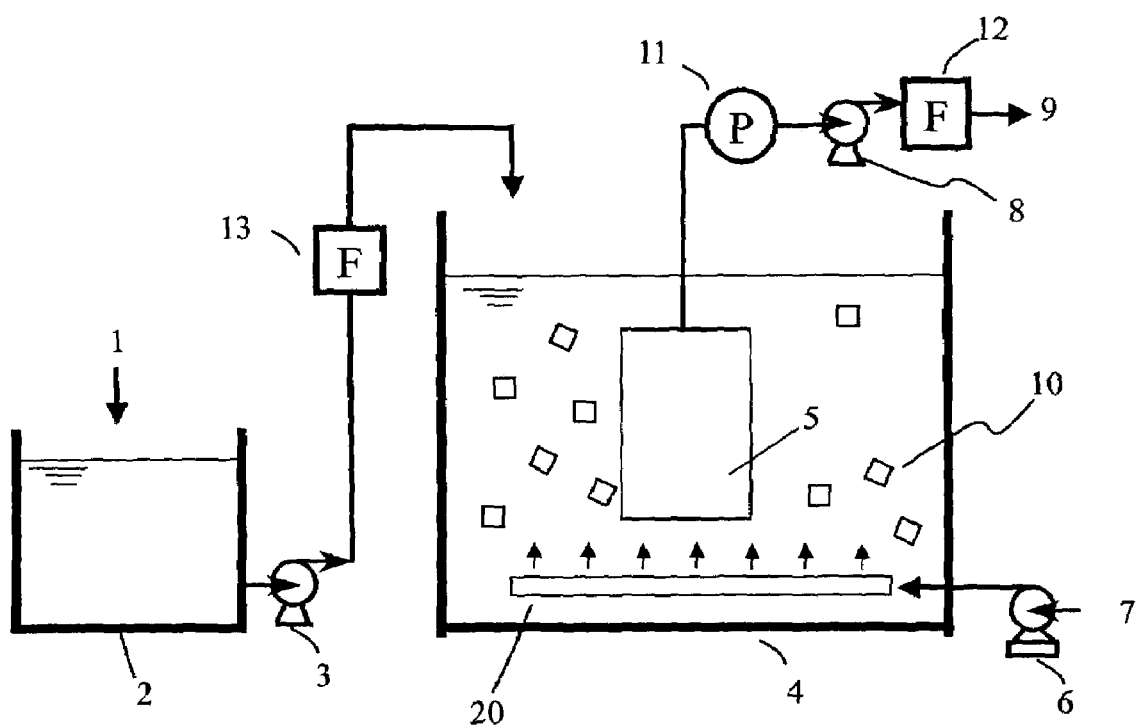
FIG. 1 shows a schematic view of a submerged membrane bioreactor system of the present invention.

As shown in FIG. 1, an influent 1 is withdrawn from an influent tank 2 by an influent pump 3 into a membrane bioreactor 4 in which a filtration module 5 is disposed. The air or oxygen 7 is made available to the system of the present invention by an aerating device 20 in conjunction with a blower 6. Depending on the populations of the microorganism, the air or oxygen 7 may be replaced by nitrogen, carbon dioxide, methane, or marsh gas. An effluent (permeate) 9 is drawn out of the membrane bioreactor 4 by an effluent pump 8. The system of the present invention further comprises an influent flow meter 13, a pressure gauge 11, and an effluent flow meter 12. The membrane bioreactor 4 of the present invention contains multiple porous carriers 10 by which the fouling of the filtration module 5 is reduced to an extent that the flux is kept at a preset level. The porous carriers 10 serve as a shelter on which microorganisms are grown fixedly. The air or gas is forced to circulate in the membrane bioreactor 4 by the aerating device 20 in conjunction with the blower 6. The circulation of the air or gas drives the porous carriers 10 to move randomly in the membrane bioreactor 4 such that the porous carriers 10 come in contact with the filtration module 5 incidentally, thereby resulting in removal of the microorganisms from the outer surface of the filtration module 5. The filtration module fouling is thus reduced.

An example described hereinafter is intended to exemplify the present invention and is to be regarded in all respects as being illustrative and nonrestrictive.

EXAMPLE 1

Four submerged membrane bioreactors similar in construction to that of FIG. 1 were used, and a synthetic wastewater was used, which was composed of sodium citrate, urea, phosphoric acid, and ferric chloride, as shown in Table 1. The four membrane bioreactors were made of an acrylate resin and were in cylindrical constructions. Each of the four membrane bioreactors had a diameter of 9 cm, a length of 80 cm, an effective depth of 53 cm, and an effective volume of 3 liters. Each membrane bioreactor was provided with an aerating device capable of supplying the membrane bioreactor air of 1.5 L per minute. As a result, the mixed liquor contained in the membrane bioreactor was maintained in aerobic conditions.

The membrane module was made of a membrane filtration material developed by the Industrial Technology Research Institute, Taiwan, with the membrane filtration material being identified by a product code of UCL-39-AA. The membrane filtration material contained an open-cell porous structure having an average porous diameter of 39 $\mu$m and a hydrophilic nonwoven outer filtration layer. The porous structure was of a tubular construction, and had a center passage with a diameter of 20 mm and a wall thickness of 6 mm. The wall served as a support of the outer filtration layer. The center passage served as an effluent passage.

Three of the four membrane bioreactors were provided with multiple foam carriers made of polyurethane. The carriers had a dimension specification of 1 cm*1 cm*1 cm. In another words, each carrier had a volume of 1 cm$^3$. The basic properties of the carriers are listed in Table 2. The three membrane bioreactors were provided with 100 pieces, 200 pieces and 300 pieces of the foam carrier respectively, with a control (comparison) membrane bioreactor containing no foam carrier.

The experiment was carried out under the operating conditions of volatile suspended solids, VSS, being 5,000 mg/L; pH being 6–8; dissolved oxygen (DO) being 2 mg/L or more; and volumetric loading being 1.0 kg COD/m$^3$·d. The experiment was started upon completion of the seeding and the acclimatization of the microorganisms. The experimental results expressed as transmembrane pressures (TMP) were shown in FIG. 2, and the fluxes or cumulative water productions were shown in FIG. 3. The experimental conditions are listed in Table 3.

Figure 2:
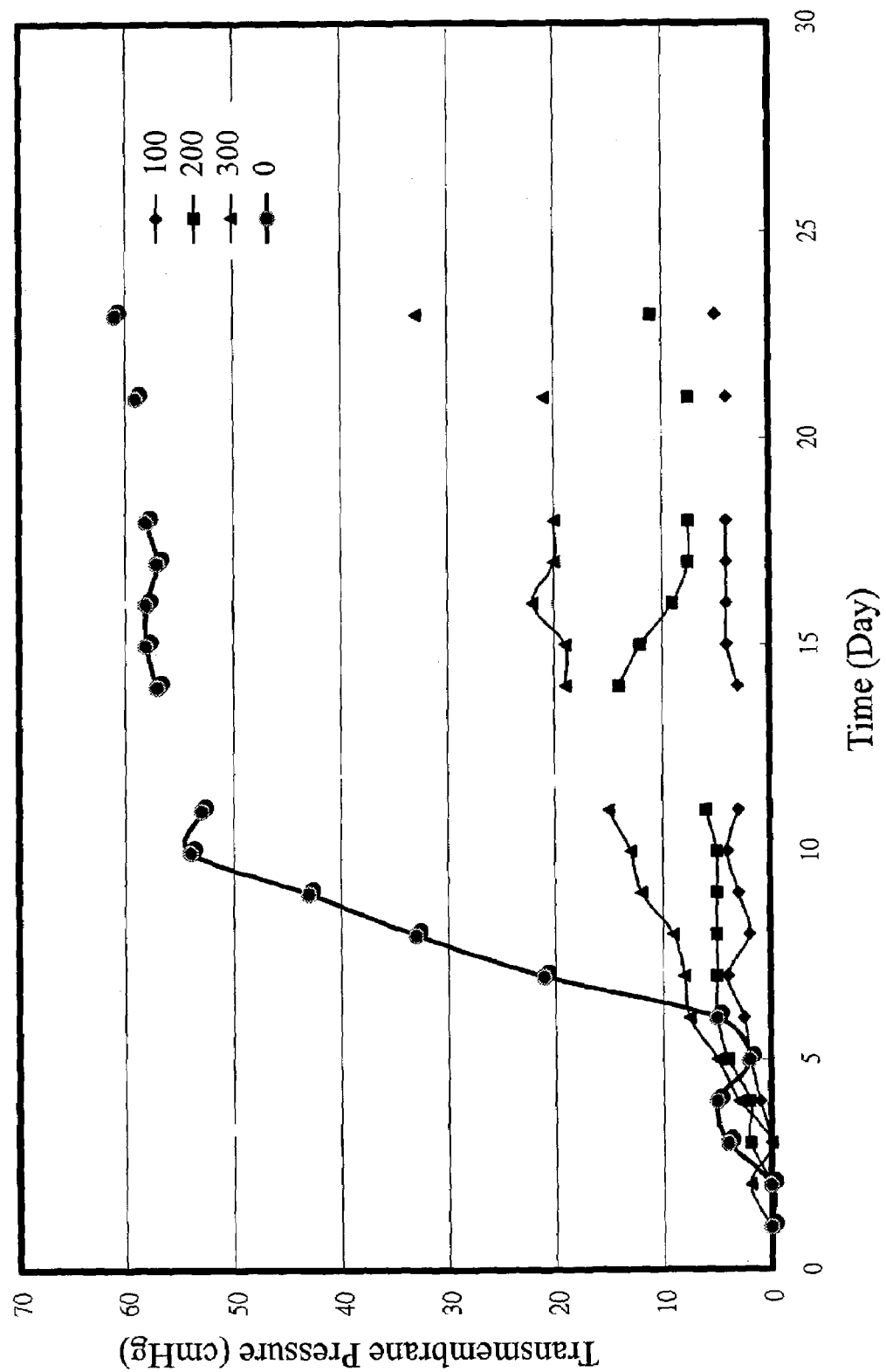
FIG. 2 is a plot of transmembrane pressure versus time with the round dots denoting a control experiment, with the diamond dots denoting a reactor of the present invention containing 100 pieces of porous carriers, with the square dots denoting a reactor of the present invention containing 200 pieces of porous carriers, and with the triangular dots denoting a reactor of the present invention containing 300 pieces of porous carriers.

It is apparent the effluent COD concentration is not affected in any way by the number of the porous carriers contained in the membrane bioreactors. This is due to the fact that the four membrane bioreactors contain the same filtration module. However, the transmembrane pressure (TMP) shows a great variation among the four membrane bioreactors, as shown in FIG. 2. For example, the TMP of the control reactor shows the fastest rise, which is about twelve times greater than that of the membrane bioreactor containing 100 pieces of the porous carriers.

Figure 3:
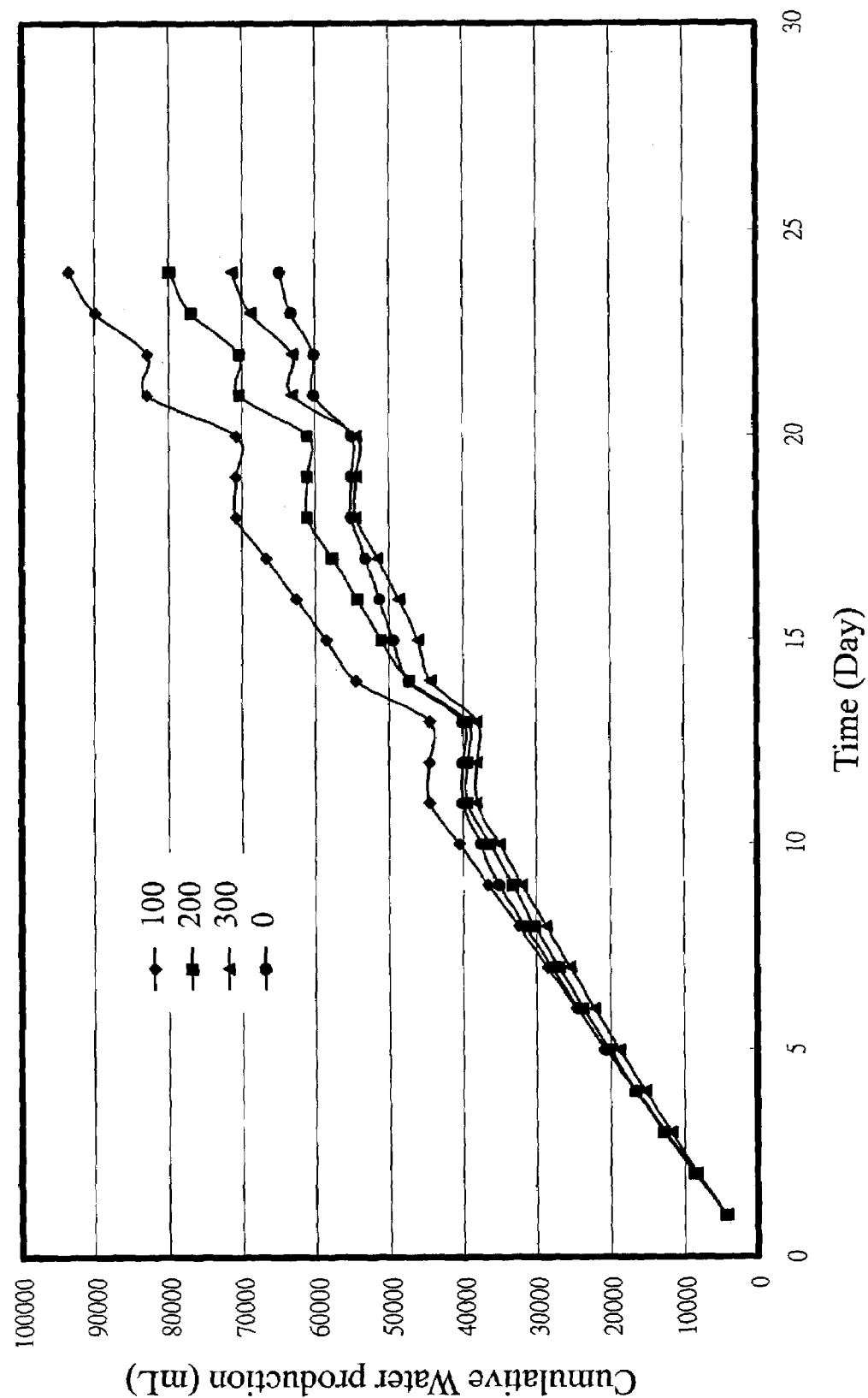
FIG. 3 shows a diagram illustrative of the cumulative water production of the present invention versus time compared to a control experiment which is denoted by the X figure, with the diamond dots denoting a reactor of the present invention containing 100 pieces of porous carriers, with the square dots denoting a reactor of the present invention containing 200 pieces of porous carriers, and with the triangular dots denoting a reactor of the present invention containing 300 pieces of porous carriers.

As shown in FIG. 3, the cumulative water production of the control reactor is about 30% less than that of the membrane bioreactor containing 100 pieces of the porous carriers.

It must be noted here that all pumps used in the four reactors were driven by the identical power, and thus the four reactors were identical in the initial flux. In light of the fouling, the cumulative water production of the membrane bioreactor containing no foam carrier decreases accordingly as the transmembrane pressure (TMP) increases in the course of wastewater treatment.

TABLE 1

Constituents of the Synthetic Wastewater

| | |
|---|---|
| Sodium citrate (COD) | 1,000~5,000 mg/L |
| Nutrition source | 2~6 ml/50 L wastewater |
| Nutrition source (COD 6,000 mg/L, addition of 2 ml/L) | |
| Urea | 160.5 g/L |
| KH$_2$HPO$_4$(K$_2$HPO$_4$) | 70 g/L (84 g) |
| FeCl$_3$·6H$_2$O | 36 g/L |

TABLE 2

Basic Properties of Polyurethane Carrier

| Density | Tensile strength | Elongation ratio |
|---|---|---|
| 28 ± 5 (kg/m$^3$) | 0.8~0.84 (kg/cm$^2$) | 240%~250% |

TABLE 3

Experimental Conditions

| Set | control | 1 | 2 | 3 |
|---|---|---|---|---|
| Number of foam carrier (piece) | 0 | 100 | 200 | 300 |
| Flow rate of air (L/min) | 1.5 | 1.5 | 1.5 | 1.5 |
| Initial concentration of sludge (mg/L) | 5000 | 5000 | 5000 | 5000 |
| Initial flux (m$^3$/m$^2$·day) | 0.1 | 0.1 | 0.1 | 0.1 |

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A method for treating wastewater/water with a membrane bioreactor, said membrane bioreactor comprising a tank containing a mixed liquor having microorganisms; porous carriers in the mixed liquor; and a filtration module comprising membrane filtration material immersed in the mixed liquor and having a permeate side in fluid communication with the mixed liquor only through the filtration module; said method comprising introducing an influent into the reactor; applying a negative pressure source to the permeate side so that fluid in the tank penetrates the filtration module into the permeate side and flows out from the tank; and aerating the mixed liquor in the tank so that the porous carriers keep contact with the filtration module in a random manner, and thus reduce fouling of the filtration module.

2. The method as defined in claim 1, wherein the porous carriers are made of compressible polymer foam having a specific surface area ranging from 100 m$^2$/m$^3$ to 2000 m$^2$/m$^3$.

3. The method as defined in claim 2, wherein the polymer foam has a density ranging from 10 kg/m$^3$ to 60 kg/m$^3$, and porosity ranging from 30% to 99%.

4. The method as defined in claim 2, wherein each of the porous carriers is a 8–125 cm$^3$ cube or sphere; wherein the porous carriers have a total volume corresponding to 1–80% of a capacity of said tank of said membrane bioreactor.

5. The water treatment as defined in claim 4, wherein said aerating is carried out at a speed ranging from 0.01 $m^3/m^2 \cdot min$ to 0.5 $m^3/m^2 \cdot min$.

6. The water treatment as defined in claim 1, wherein the filtration module has a flux ranging from 0.01 $m^3/m^2 \cdot day$ to 0.5 $m^3/m^2 \cdot day$ at the time when said negative pressure source is applied to said permeate side of said filtration module.

* * * * *